N. J. SKAGGS.
Tire-Tightener.
No. 18,556. Patented Nov. 3, 1857.
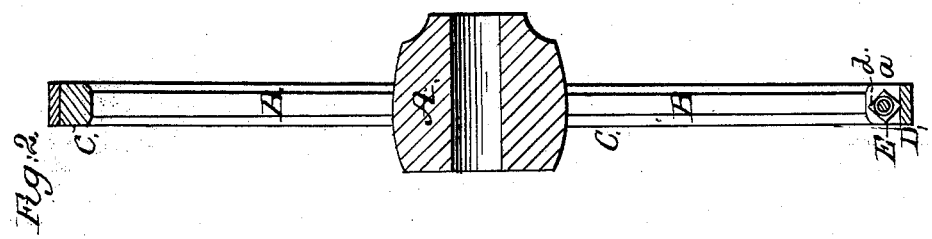
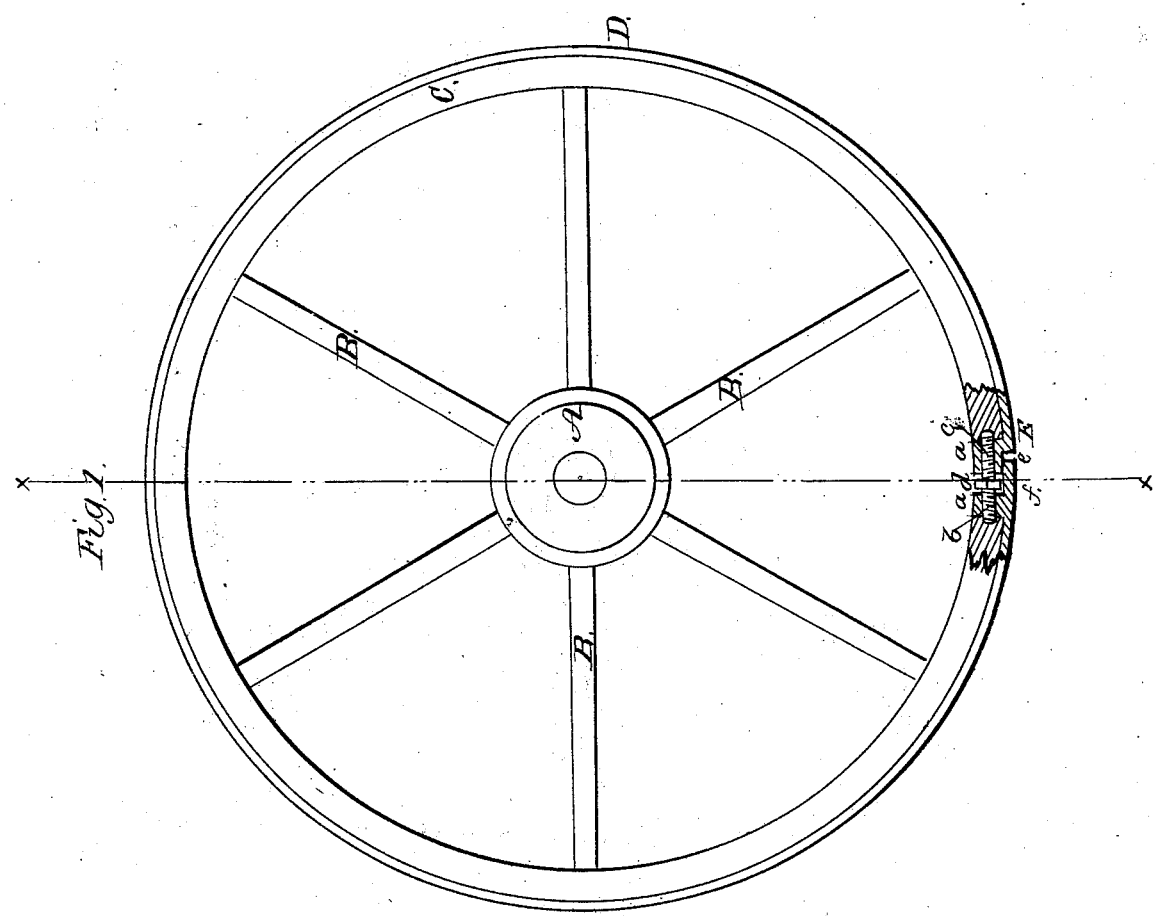

UNITED STATES PATENT OFFICE.

N. J. SKAGGS, OF TALLADEGA, ALABAMA.

MODE OF TIGHTENING TIRES ON CARRIAGE-WHEELS.

Specification of Letters Patent No. 18,556, dated November 3, 1857.

*To all whom it may concern:*

Be it known that I, N. J. SKAGGS, of Talladega, in the county of Talladega and State of Alabama, have invented a new and Improved Mode of Tightening Tires on the Wheels of Vehicles; and I do hereby declare that the following is a full, clear, and exact description of the same, reference being had to the annexed drawings, making a part of this specification, in which—

Figure 1, is a side or face view of a wheel showing my improvement. Fig. 2 is a section of same, taken in the line (*x*) (*x*) Fig. 1.

Similar letters of reference indicate corresponding parts in the two figures.

This invention relates to an improvement in that mode of tightening tires on wheels in which the tire instead of having its ends welded so as to form a rigid and continuous band, has its ends connected by a screw so that the diameter of the tire, by turning the screw, may be decreased while on the wheel and at any time when necessary to compensate for the shrinking of the same. This arrangement although possessing many advantages over the old mode has one great objection viz., an imperfect joint caused by the space left between the ends of the tire. This is in a measure obviated by having a cap fitted over the adjoining ends of the tire, but this is attended with considerable difficulty, and adds to the expense of construction.

My invention consists in the peculiar means employed for obviating this difficulty which is done by having the ends of the tire so formed and the screw connection so arranged relatively therewith that the ends are made to overlap and a comparatively unbroken or continuous joint or connection obtained.

To enable those skilled in the art to fully understand and construct my invention I will proceed to describe it.

A represents the hub, B the spokes, and C, the fellies of a wheel. These parts are constructed in the usual manner and therefore do not require a minute description.

D is the tire which is shrunk on the wheel in the usual way, the ends of the tire however are not united by a weld but have square heads (*a*) formed on them, one on each, the heads being formed on the inner side of the tire, their outer sides abutting against opposite ends of the felly C, which are not connected, See Fig. 1.

E is a rod having a right and left screw thread (*b*) (*c*) formed on it and a square (*d*) formed at its center. The screw portions of the rod pass into the heads (*a*) and connect the ends of the tire.

The ends of the tire at the outer surfaces of the heads (*a*) (*a*) are so arranged as to form a "lap joint", that is a recess (*e*) is allowed on one head and a projecting piece (*f*) is formed on the other head, the piece (*f*) over lapping the head at the opposite end of the tire and fitting in the recess (*e*), see Fig. 1.

From the above description of parts it will be seen that a continuous joint or connection is formed and the bolt or rod E protected without the use of a cap or socket, which forms an imperfect and uneven connection.

The rod E, is turned by applying a wrench to the square (*d*) and the tire contracted in diameter as desired so that it may always be kept snugly adjusted upon the wheel.

I would remark that the length of the projection (*f*) and recess (*e*) should be such that the projection will at all times overlap and still afford space to admit of the necessary contraction of the tire.

I do not claim separately connecting the ends of the tire together by means of a screw for this has been previously done; but,

Having thus described my invention what I claim as new and desire to secure by Letters Patent is,

Forming the ends of the tire with the heads (*a*) (*a*) recess (*e*) and projecting portion (*f*) as shown, in connection with the screw rod E, by which the ends are secured together and the tire contracted as may be desired and a continuous or perfect joint or connection obtained.

N. J. SKAGGS.

Witnesses:
I. S. M. CURRY,
L. W. SIMMONS.